UNITED STATES PATENT OFFICE.

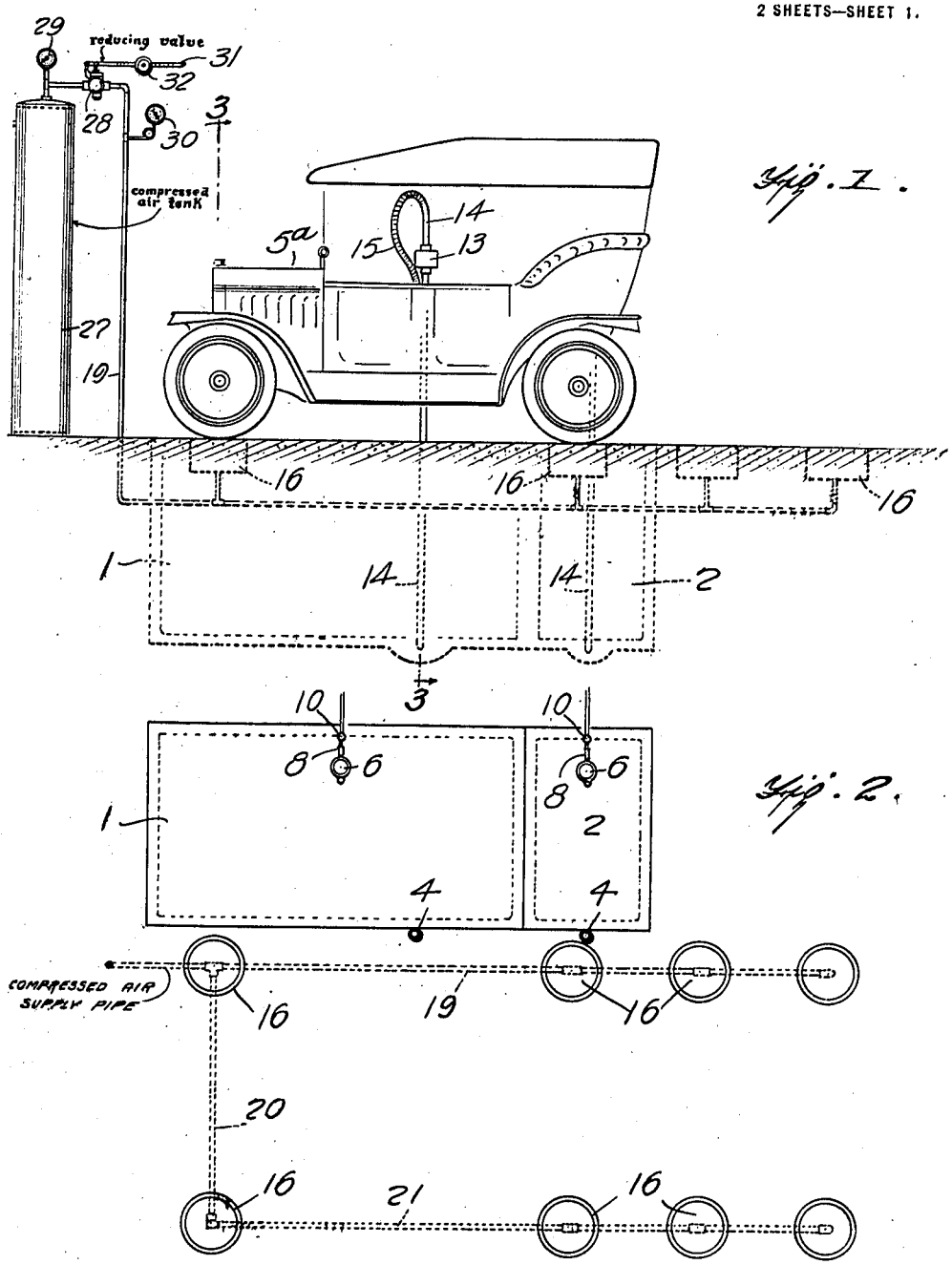

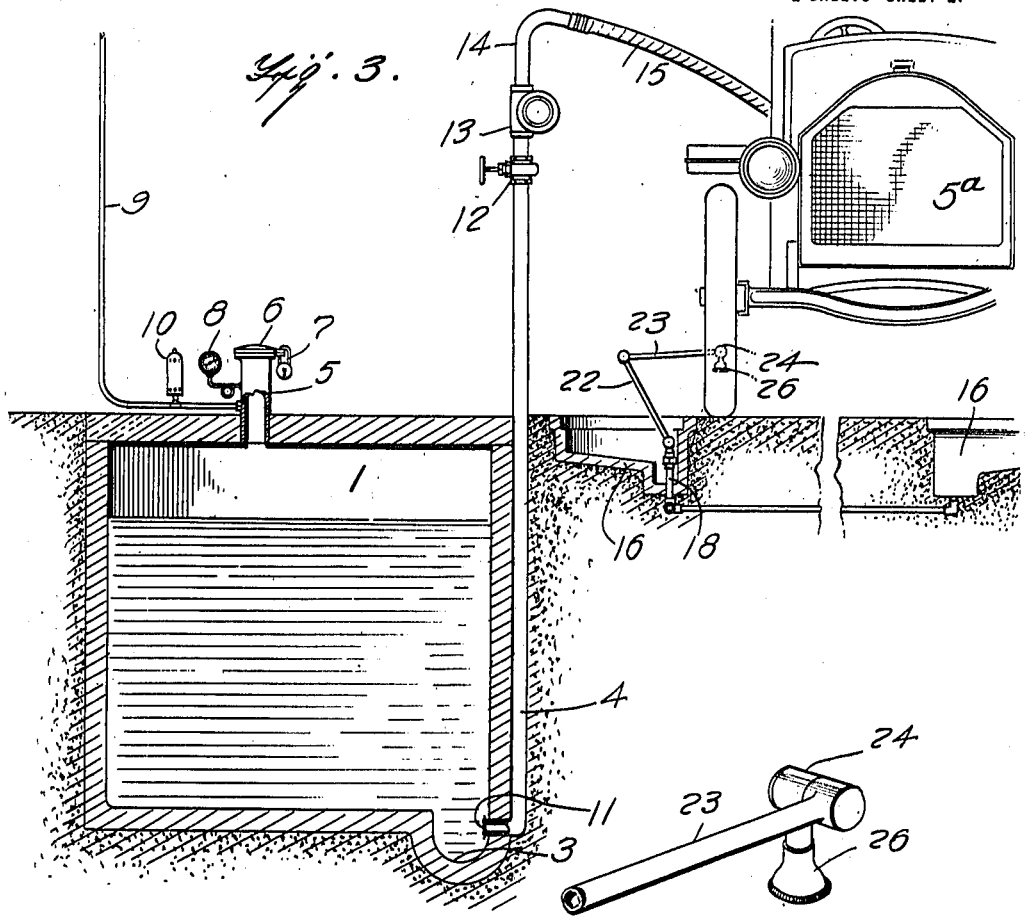
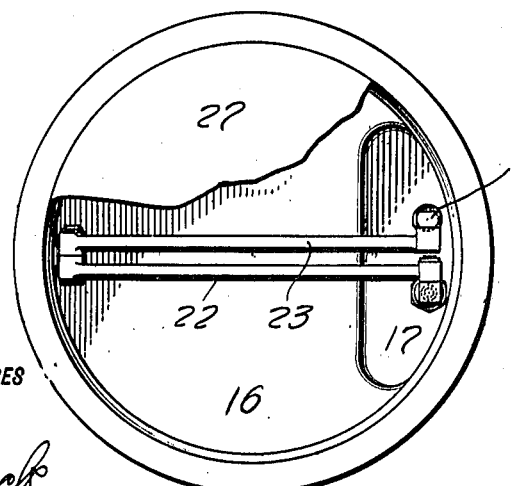

JOHN MORRILL PERLEY, OF KIRKSVILLE, MISSOURI.

DISPENSING SYSTEM.

1,280,829.  Specification of Letters Patent.  Patented Oct. 8, 1918.

Application filed July 18, 1917. Serial No. 181,280.

*To all whom it may concern:*

Be it known that I, JOHN MORRILL PERLEY, a citizen of the United States, and a resident of Kirksville, in the county of Adair and State of Missouri, have invented new and useful Improvements in Dispensing Systems, of which the following is a specification.

My invention is an improvement in dispensing systems, and has for its object to provide mechanism of the character specified for permitting a motor vehicle to be simultaneously supplied with fuel, oil and air for the tires, wherein reservoirs are provided for the fuel and oil, and pits for containing the air supply pipes, the said pits being arranged in such manner that when the vehicle is driven alongside the reservoirs for fuel and oil, the wheels will be at the pits.

In the drawings:

Figure 1 is a diagrammatic side view showing the arrangement of the reservoirs and pits;

Fig. 2 is a diagrammatic plan view of the same;

Fig. 3 is a section on the line 3—3 of Fig. 1, looking in the direction of the arrows adjacent the line;

Fig. 4 is a top plan view of one of the pits, with part of the cover broken away;

Fig. 5 is a perspective view of the air gage.

In the present embodiment of the invention, a reservoir 1 for fuel is provided, and a reservoir 2 for oil, the said reservoirs being arranged beneath the surface of the ground and being preferably of reinforced concrete, and tar paper is preferably arranged between the concrete and the earth.

Each of the reservoirs has a depression 3 in its bottom and near one side, and the supply pipe 4 for the motor vehicle, indicated at 5ª, leads from this depression or pit in the reservoir. Each reservoir is also provided with a filling nipple 5, having a cover 6 which may be locked, as indicated at 7, and a gage 8 is provided in connection with the reservoir at the nipple. Fluid under pressure is supplied to each reservoir by means of a pipe 9, the said pipe delivering to the nipple 5, and a safety valve 10 is provided in connection with each pipe. It will be understood that the reservoirs 1 and 2 are alike, except for size, the fuel reservoir being of greater size than the oil reservoir.

The pipe 4 has a screen 11 at its inlet end, and the said pipe extends above the surface of the ground a suitable distance, and is provided with a gate valve 12 for controlling the flow through the same, and with a meter 13 for measuring the amount of fluid passing through the pipe. At its upper end the pipe has a lateral bend 14, and a flexible pipe 15 is connected with the bend, the said pipe or hose being adapted to conduct the fuel from the pipe to the tank of the motor vehicle 5ª.

A series of air pits 16 is provided, the said pits being alike, and being arranged in two rows, spaced apart distances corresponding to the spacing apart of the wheels or tread of the motor vehicle. Two of these pits are arranged at the position that will be occupied by the front wheels of a motor vehicle when it is stopped at the reservoirs. Three other pairs are provided, the said pairs being spaced apart from the first named pair distances corresponding to the spacing of the front and rear wheels of different sizes of motor vehicles, so that large and small vehicles, when stopped, have their wheels at the air pits.

In each of these pits there is a depression 17 in the bottom, and an air pipe 18 extends upwardly through this depression in each pit. These air pipes 18 are supplied with air under pressure by means of pipes 19, 20 and 21, which provide for the same pressure in each pipe 18. Folding pipe sections 22 and 23 are connected with the pipe 18, the pipe 22 being hinged to the pipe 18 while the pipe 23 is hinged to the pipe 22, in such a manner that the pipes 22 and 23 may be folded into the pit, as shown in Fig. 4, or may be unfolded, as shown in Fig. 3, to supply air to the tire. Each pipe 23 has a short section 24 of pipe hinged thereto, the said pipe 24 carrying at its lower end a connection 26 for engaging the air valve of the tire.

In operation, when a vehicle stops at the dispensing system, the valves 12 controlling the fuel and oil are opened, after the hose 15 has been connected with the respective tanks. The pits 16, which have removable covers, are uncovered, and the pipes 22 and 23 are unfolded. The connections 26 are applied to the valves of the tires, and air under pressure is admitted to the tires. The proper pressure will be shown by the gage at each tire.

As shown in Fig. 1, the tank 27 for supplying fluid under pressure to which the pipe 19 is connected is arranged directly in front of the driver of the automobile 5ª when the automobile is over the pits 16. A reducing valve 28 is interposed in said pipe, and gages 29 and 30 are arranged on opposite sides of the reducing valve, the gage 29 showing the pressure in the tank while the gage 30 shows the pressure in the pipe line 19. This valve 28 is controlled by an arm 31, upon which a weight 32 is mounted to slide, the arrangement being such that any desired pressure may be obtained by means of the reducing valve in the pipe 19.

I claim:

1. A dispensing system for motor vehicles for dispensing oil and fluid under pressure, and comprising underground reservoirs for the fuel and the oil, said reservoirs having filling openings and gages and fluid pressure supply pipes having safety valves, each reservoir having a discharge pipe leading therefrom, a valve controlling each pipe, and a meter in connection with each pipe beyond the valve, each pipe having a delivery hose, a series of pairs of pits arranged adjacent to the reservoirs and spaced to correspond with the spacing of the wheels of different sizes of motor vehicles, a fluid under pressure supply pipe in each pit, a valve casing having a connection for the air valves of the tires, and a gage at each pit, and a folding connection between each air supply pipe and said casing for permitting the casing to be swung into or out of the pit.

2. A dispensing system for motor vehicles for dispensing oil and fluid under pressure, and comprising underground reservoirs for the fuel and oil, said reservoirs having filling openings and gages and fluid pressure supply pipes having safety valves, each reservoir having a discharge pipe leading therefrom, a valve controlling each pipe, and a meter in connection with each pipe, beyond the valve, each pipe having a delivery hose, a series of pairs of pits arranged adjacent to the reservoirs and spaced to correspond with the spacing of the wheels of different sizes of motor vehicles, a fluid under pressure supply pipe in each pit, and a folding connection for connecting each pipe with the valve casing of a tire.

3. A dispensing system for motor vehicles for dispensing oil and fluid under pressure, and comprising underground reservoirs for the fluid and oil, said reservoirs having filling openings and gages and fluid pressure supply pipes having safety valves, each reservoir having a discharge pipe leading therefrom, a valve controlling each pipe, a meter in connection with each pipe beyond the valve, each pipe having a delivery hose, a series of pairs of pits arranged adjacent to the reservoirs and spaced to correspond with the spacing of the wheels of different sizes of motor vehicles, a fluid under pressure supply pipe in each pit, and means for connecting each pipe with the valve casing of the tire.

4. A dispensing system for motor vehicles for dispensing oil and fluid under pressure, and comprising underground reservoirs for the fluid and the oil, a valve controlling each pipe, a meter in connection with each pipe beyond the valve, each pipe having a delivery hose, a series of pairs of pits arranged adjacent to the reservoirs and spaced to correspond with the spacing of the wheels of different sizes of motor vehicles, a fluid under pressure supply pipe in each pit, and means for connecting each pipe with the valve casing of the tire.

5. A dispensing system for motor vehicles for dispensing air under pressure, comprising a reservoir for the air, a series of pits spaced to correspond with the spacing of the wheels of different sizes of motor vehicles, a delivery pipe in each pit, and means for connecting each pipe to the valve casing of the tire.

JOHN MORRILL PERLEY.

Witnesses:
PAUL D. HIGBEE,
C. B. MATTHEWS.